United States Patent
Jung et al.

(10) Patent No.: US 9,594,206 B2
(45) Date of Patent: Mar. 14, 2017

(54) COMPLEX SUBSTRATE FOR DISPLAY APPARATUS, DISPLAY APPARATUS HAVING THE SAME AND METHOD OF MANUFACTURING THE SAME

(71) Applicant: SAMSUNG DISPLAY CO., LTD., Yongin, Gyeonggi-Do (KR)

(72) Inventors: Yang-Ho Jung, Seoul (KR); Hoon Kang, Suwon-si (KR); Chul-Won Park, Gwangmyeong-si (KR); Jin-Ho Ju, Seoul (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/488,445

(22) Filed: Sep. 17, 2014

(65) Prior Publication Data
US 2015/0241622 A1     Aug. 27, 2015

(30) Foreign Application Priority Data
Feb. 27, 2014  (KR) .................. 10-2014-0023008

(51) Int. Cl.
*H01L 21/4763* (2006.01)
*F21V 8/00* (2006.01)
*G02B 5/04* (2006.01)
*G02B 5/30* (2006.01)
*G02B 3/00* (2006.01)
*G02F 1/1335* (2006.01)

(52) U.S. Cl.
CPC ......... *G02B 6/0056* (2013.01); *G02B 3/0037* (2013.01); *G02B 5/045* (2013.01); *G02B 5/3058* (2013.01); *G02B 6/0053* (2013.01); *G02F 1/133528* (2013.01); *G02B 6/0065* (2013.01); *G02F 2001/133548* (2013.01); *G02F 2001/133565* (2013.01)

(58) Field of Classification Search
CPC ........................... G02B 6/0056; G02B 3/0037
USPC .......................................... 438/624
See application file for complete search history.

(56) References Cited

U.S. PATENT DOCUMENTS

| 5,182,184 | A | 1/1993 | Lazarus et al. |
| 5,208,138 | A | 5/1993 | Lazarus et al. |
| 7,784,954 | B1 * | 8/2010 | Coleman ............... G02B 5/021 362/19 |

(Continued)

FOREIGN PATENT DOCUMENTS

| JP | 2004-354609 A | 12/2004 |
| JP | 2009-222923 A | 10/2009 |

(Continued)

*Primary Examiner* — Kimberly Rizkallah
*Assistant Examiner* — Maria Ligai
(74) *Attorney, Agent, or Firm* — Lee & Morse P.C.

(57) ABSTRACT

A complex substrate for a display apparatus, the complex substrate includes a lower base substrate including convex and concave patterns, the convex and concave patterns being integral with an upper side of the lower base substrate, a planarizing layer on the lower base substrate, the planarizing layer being integral with the convex and concave patterns, and the planarizing layer having different refractivity from the lower base substrate, and a wire grid pattern on the planarizing layer, the wire grid pattern including a plurality of nano wire metal patterns, each of the nano wire metal patterns having a width of no more than a micrometer.

18 Claims, 16 Drawing Sheets

(56) References Cited

U.S. PATENT DOCUMENTS

| | | | |
|---|---|---|---|
| 2004/0080926 A1* | 4/2004 | Chen | G02B 6/0023 362/609 |
| 2006/0058473 A1 | 3/2006 | Kawada et al. | |
| 2006/0098140 A1* | 5/2006 | Lee | G02B 5/3058 349/98 |
| 2008/0128728 A1* | 6/2008 | Nemchuk | G02F 1/133603 257/98 |
| 2011/0081613 A1 | 4/2011 | Takeda et al. | |
| 2012/0168889 A1* | 7/2012 | Ooka | H01L 27/14625 257/432 |
| 2012/0296053 A1 | 11/2012 | Hanamura et al. | |
| 2012/0307160 A1* | 12/2012 | Yokota | G02F 1/133707 348/725 |
| 2013/0114027 A1* | 5/2013 | Hasegawa | G02B 5/305 349/96 |

FOREIGN PATENT DOCUMENTS

| | | |
|---|---|---|
| KR | 10-2005-0059224 A | 6/2005 |
| KR | 10-2013-0100989 A | 9/2013 |
| WO | WO 2010-147155 A1 | 12/2010 |

\* cited by examiner

COMPLEX SUBSTRATE FOR DISPLAY APPARATUS, DISPLAY APPARATUS HAVING THE SAME AND METHOD OF MANUFACTURING THE SAME

CROSS-REFERENCE TO RELATED APPLICATION

Korean Patent Application No. 10-2014-0023008, filed on Feb. 27, 2014, in the Korean Intellectual Property Office, and entitled: "Complex Substrate For Display Apparatus, Display Apparatus Having The Same And Method Of Manufacturing The Same," is incorporated by reference herein in its entirety.

BACKGROUND

1. Field

Exemplary embodiments relate to a complex substrate for a display apparatus, a display apparatus having the same, and a method of manufacturing the same. More particularly, exemplary embodiments relate to a complex substrate for a display apparatus having decreased thickness and improved image display quality, a display apparatus having the same, and a method of manufacturing the same.

2. Description of the Related Art

Display apparatuses may be classified into active-type display apparatuses and passive-type display apparatuses. The active-type display apparatus displays an image using an active element that generates light. The passive-type display apparatus displays an image by controlling light transmittance of light generated by a light source.

The passive-type display apparatus may include a display panel and a backlight assembly. For example, the display panel may include a liquid crystal element, an electrophoretic element, etc., and the backlight assembly supplies light to the display panel.

SUMMARY

Exemplary embodiments provide a complex substrate for a display apparatus having decreased thickness and improved image display quality.

Exemplary embodiments also provide a display apparatus having the above-mentioned complex substrate.

Exemplary embodiments also provide a method of manufacturing the above-mentioned complex substrate.

In an exemplary embodiment, a complex substrate for a display apparatus includes a lower base substrate including convex and concave patterns, the convex and concave patterns being integral with an upper side of the lower base substrate, a planarizing layer on the lower base substrate, the planarizing layer being integral with the convex and concave patterns, and the planarizing layer having different refractivity from the lower base substrate, and a wire grid pattern on the planarizing layer, the wire grid pattern including a plurality of nano wire metal patterns, each of the nano wire metal patterns having a width of no more than a micrometer.

The convex and concave patterns may include a plurality of repeating triangular prism patterns.

The plurality of prism patterns may be directly on an upper surface of the lower base substrate.

The lower base substrate, the planarizing layer, and the wire grid pattern may be integrally and sequentially stacked on top of each other, in the stated order.

The convex and concave patterns may include a micro lens array having a plurality of repeating semi hemispherical shapes.

The micro lens array may be on the lower base substrate, and includes a different material from the lower base substrate.

The micro lens array may exhibit a different refractivity than the lower base substrate.

The lower base substrate, the micro lens array, the planarizing layer, and the wire grid pattern may be integrally and sequentially stacked on top of each other, in the stated order.

An aspect ratio of the nano wire metal patterns may be 3 or less.

The nano wire metal patterns may include aluminum.

The wire grid pattern may transmit P polarized light, and reflects S polarized light.

The complex substrate may further include a light controlling member on the wire grid pattern.

The lower base substrate, the convex and concave patterns, and the planarizing layer may be integrated into a single structure having flat upper and lower surfaces.

The planarizing layer may have a complementary shape with respect to the convex and concave patterns, the planarizing layer fitting within spaces between adjacent convex and concave patterns.

In another exemplary embodiment, a display apparatus includes a light source generating light, a diffusion plate on the light source to increase luminance uniformity of the light generated from the light source, a complex substrate on the diffusion plate, the complex substrate including a lower base substrate including convex and concave patterns, the convex and concave patterns being integral with an upper side of the lower base substrate, a planarizing layer on the lower base substrate, the planarizing layer being integral with the convex and concave patterns, and the planarizing layer having different refractivity from the lower base substrate, and a wire grid pattern on the planarizing layer, the wire grid pattern including a plurality of nano wire metal patterns, each of the nano wire metal patterns having a width of no more than a micrometer, a light controlling member on the wire grid pattern of complex substrate to change light transmittance based on an image signal, and an upper substrate on the light controlling member.

In yet another exemplary embodiment, a method of manufacturing a complex substrate for a display apparatus, the method includes forming a lower base substrate including convex and concave patterns, the convex and concave patterns being integral with an upper side of the lower base substrate, forming a planarizing layer on the lower base substrate, the planarizing layer being integral with the convex and concave patterns, and the planarizing layer having different refractivity from the lower base substrate, and forming a wire grid pattern on the planarizing layer, the wire grid pattern including a plurality of nano wire metal patterns, each of the nano wire metal patterns having a width of no more than a micrometer.

Forming the planarizing layer may include coating a transparent material on the convex and concave patterns, the convex and concave patterns being a prism sheet or a hemispherical micro lens array.

The convex and concave patterns may be a prism sheet, forming the prism sheet including forming a photoresist pattern having a stripe shape on the lower base substrate, the stripe shape having linear patterns spaced apart from each other by a constant interval, etching the lower base substrate using the photoresist pattern as an etching mask to form the prism sheet with a prism pattern on an upper surface of the lower base substrate, such that undercuts are formed under opposite sides of the photoresist pattern, and removing the photoresist pattern from the prism sheet.

The convex and concave patterns may be a hemispherical lens array, and forming the hemispherical lens array include filling photoresist material in a printing cast, the printing cast having repeating semi hemispherical concave shapes, attaching the filled photoresist material to the lower base substrate, solidifying the photoresist material that is attached on the lower base substrate, and removing the printing cast from the solidified photoresist material.

Forming the wire grid pattern may include forming a wire metal layer on the planarizing layer, printing a wire grid photoresist on the wire metal layer, and etching the wire metal layer using the wire grid photoresist as an etching mask.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
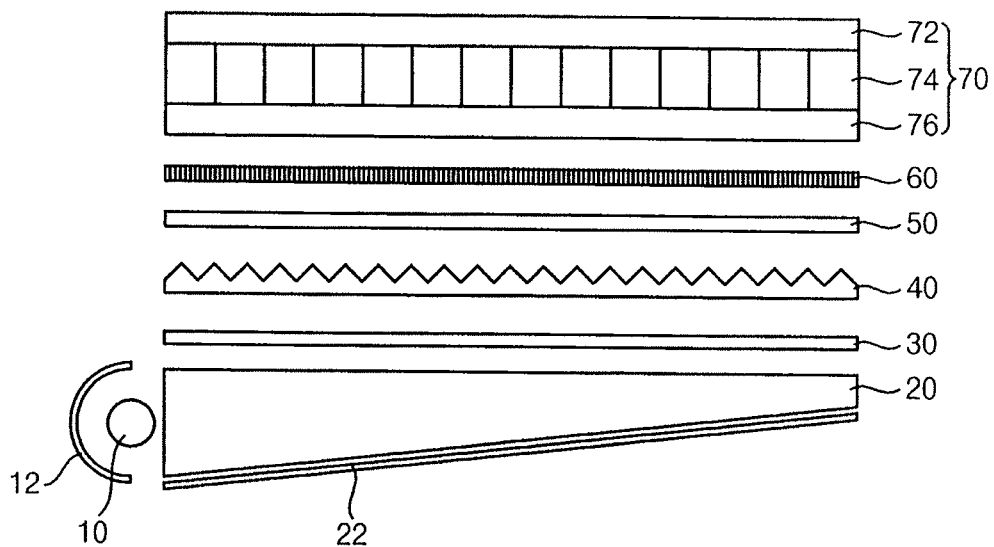
FIG. 1 illustrates a cross-sectional view of a display apparatus according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, embodiments will be explained in detail with reference to the accompanying drawings.

FIG. 1 illustrates a cross-sectional view of a display apparatus according to an exemplary embodiment.

Referring to FIG. 1, the display apparatus may include a light source 10, a side reflecting plate 12, a light guide plate 20, a rear reflecting plate 22, a diffusion plate 30, a prism sheet 40, a protective film 50, a polarizing plate 60, and a display panel 70. The light source 10 generates and emits light.

The side reflecting plate 12 may surround a side of the light source 10. A portion of the light generated from the light source 10 is reflected from the side reflecting plate 12 to be guided toward the light guide plate 20.

The light guide plate 20 may be disposed on another side of the light source 10 to guide the light generated from the light source 10 toward the display panel 70. For example, as illustrated in FIG. 1, the light source 10 may be between the side reflecting plate 12 and the light guide plate 20.

The rear reflecting plate 22 may be disposed on a rear surface of the light guide plate 20 to guide light, e.g., light leaked from the light guide plate 20, toward the light guide plate 20. For example, as illustrated in FIG. 1, the light guide plate 20 may be between the rear reflecting plate 22 and the display panel 70.

The diffusion plate 30 may be disposed on the light guide plate 20 to increase luminance uniformity of the light having passed through, e.g., emitted from, the light guide plate 20. For example, as illustrated in FIG. 1, the diffusion plate 30 may be between the light guide plate 20 and the display panel 70.

The prism sheet 40 may be disposed on the diffusion plate 30 to refract the light having passed through, e.g., emitted from, the diffusion plate 30, so that the light is guided toward the display panel 70. For example, as illustrated in FIG. 1, the prism sheet 40 may be between the diffusion plate 30 and the display panel 70.

The protective film 50 may be disposed on the prism sheet 40 to protect the prism sheet 40. For example, the protective film 50 prevents deformation of a peak portion of the prism sheet 40.

The polarizing plate 60 may be disposed between the protective film 50 and the display panel 70 to polarize the light that have passed through the protective film 50, e.g., to polarize light directed from the protective film 50 toward the display panel 70. In the present exemplary embodiment, the polarizing plate 60 includes a wire grid pattern. The wire grid pattern includes a plurality of patterns having a width of no more than a micrometer. When light passes through the wire grid pattern of the polarizing plate 60, i.e., through patterns having a width of no more than a micrometer, the light is polarized by diffraction, interference, etc.

Polarization using the wire grid pattern of the polarizing plate 60 has greater light transmittance than a polymer polarizing plate using optical anisotropy. For example, light transmittance of a polymer polarizing plate using optical anisotropy is no more than about 50%, while light transmittance of the polarizing plate 60 having the wire grid pattern is more than about 60%. In particular, a polymer polarizing plate using optical anisotropy absorbs a large portion of light transmitted therethrough, while the polarizing plate 60 having the wire grid pattern reflects a non-transmitted portion of light transmitted therethrough so that the lifetime of the polarizing plate 60 is long and the reflected light therethrough is recyclable, e.g., retransmitted after reflection back.

The display panel 70 may be disposed on the polarizing film 60 and controls light transmittance of the light directed from the polarizing plate 60 toward the display panel 70, thereby displaying an image. In the present exemplary embodiment, the display panel 70 includes a liquid crystal panel.

The display panel 70 may include a lower substrate 76, a light controlling member 74, and an upper substrate 72. In the present exemplary embodiment, the light controlling member 74 includes a liquid crystal element. Liquid crystals of the liquid crystal element control a polarization state of light that has passed through the polarizing plate 60, i.e., light directed from the polarizing plate 60 toward the display panel 70.

For example, if the polarization state of the liquid crystals is different from that of the light directed from the polarizing plate 60 toward the display panel 70, the light from the polarizing plate 60 is blocked by the light crystal element. In contrast, if the polarization state of the liquid crystals is substantially the same as that of the light directed from the polarizing plate 60 toward the display panel 70, the light from the polarizing plate 60 passes through the light crystal element to display an image on the display panel 70. In another example, an additional polarizing film (not shown) may be disposed on the display panel 70.

According the present exemplary embodiment, the polarizing plate 60 of the display apparatus includes the wire grid pattern, so that the lifetime is increased and the luminance is improved.

Figure 2:
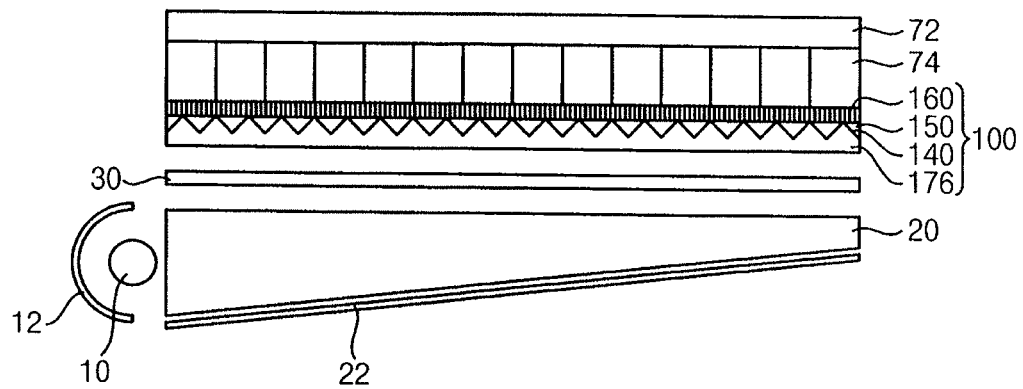
FIG. 2 illustrates a cross-sectional view of a display apparatus according to an exemplary embodiment.

FIG. 2 illustrates a cross-sectional view of a display apparatus according to another exemplary embodiment.

Referring to FIG. 2, the display apparatus may include the light source 10, the side reflecting plate 12, the light guide plate 20, the rear reflecting plate 22, the diffusion plate 30, a complex substrate 100, the light controlling member 74, and the upper substrate 72.

The light source 10 generates and emits light. In the present exemplary embodiment, the light source 10 may include, e.g., a light emitting diode (LED), a cold cathode fluorescent lamp (CCFL), etc.

The side reflecting plate 12 surrounds a side of the light source 10. A portion of the light generated from the light source 10 is reflected from the side reflecting plate 12 to be guided back toward the light guide plate 20.

The light guide plate 20 is disposed on another side of the light source 10 to guide the light generated from the light source 10 toward the display panel 70. For example, as illustrated in FIG. 2, the light guide plate 20 may have a wedge shape. In another example, the light guide plate 20 may have a substantially rectangular parallelepiped shape, a sawtooth shape, etc. In yet another example, the light source 10 may include a surface light source, and the light guide plate 20 may be omitted.

The rear reflecting plate 22 may be disposed on the rear surface of the light guide plate 20 to guide light back toward the light guide plate 20. In the present exemplary embodiment, the side reflecting plate 12 and the rear reflecting plate 22 reflect leaked light toward the light guide plate 20, thereby increasing luminance of the display apparatus.

The diffusion plate 30 may be disposed on the light guide plate 20 to increase the luminance uniformity of the light having passed through the light guide plate 20. For example, the diffusion plate 30 may include bubbles, impurities, micro patterns formed on a surface thereof, etc., thereby diffusing the light.

The complex substrate 100 may be disposed on the diffusion plate 30. The complex substrate 100 improves optical characteristics of the light having passed through the diffusion plate 30 and supports the light controlling member 74. The complex substrate 100 may include a lower base substrate 176, a prism pattern 140, a planarizing layer 150, and a wire grid pattern 160.

The lower base substrate 176 includes a transparent material, e.g., tempered glass, synthetic resin, etc.

The prism pattern 140 is formed on, e.g., directly on, the lower base substrate 176. The prism pattern 140 includes repeating triangular prisms. In the present exemplary embodiment, the prism pattern 140 is integrally formed with the lower base substrate 176, e.g., the prism pattern 140 and the lower base substrate 176 may be integrated into a same unit.

Light incident on a lower surface of the complex substrate 100, i.e., on a lower surface of the lower base substrate 176, is refracted toward a front of the display apparatus while the light exits the prism pattern 140. Thus, the front luminance of the display apparatus is improved.

For example, the prism pattern 140 has a stepped portion, e.g., height, of about 10 μm to about 200 μm. Also, an apex angle of the prism pattern 140 may be about 10 degrees to about 70 degrees.

The planarizing layer 150 may be disposed on the lower base substrate 176 and is integrally formed with the prism pattern 140, e.g., the prism pattern 140 and the planarizing layer 150 may be integrated into a same unit. For example, the planarizing layer 150 may cover upper surfaces of the prism pattern 140 that face the wire grid pattern 160. For example, the planarizing layer 150 may completely fill spaces between adjacent repeating triangular prisms of the prism pattern 140 to define a surface substantially level with apexes of the repeating triangular prisms, e.g., the planarizing layer 150 and the prism pattern 140 may have complementary shapes integrated into one structure. The planarizing layer 150 includes a transparent and heat resistant material, e.g., a metal oxide, a high heat resistant plastic, a ceramic, etc. For example, the metal oxide used for the planarizing layer 150 may include silicon oxide, silicon nitride, etc. In another example, the planarizing layer 150 may include polyimide, siloxane, etc. The planarizing layer 150 has different refractivity from the lower base substrate 176, i.e., the planarizing layer 150 and the lower base substrate 176 have different refractive indices.

The wire grid pattern 160 is disposed on the planarizing layer 150 to polarize the light having passed through the planarizing layer 150. The wire grid pattern 160 includes a plurality of nano wire metal patterns having a size of no more than a micron. The wire grid pattern 160 has a width of tens of nanometers to about hundreds of nanometers, thereby displaying polarizing characteristics. For example, the wire grid pattern 160 may include a plurality of aluminum patterns having a width of tens of nanometers. In the present exemplary embodiment, an aspect ratio of the wire grid pattern 160 may be no more than 3. The aspect ratio is a ratio of a width of each nano wire metal pattern to an interval between two adjacent nano wire metal patterns.

In the present exemplary embodiment, the wire grid pattern 160 includes a reflective type polarizing plate. For example, the wire grid pattern 160 transmits P-polarized light toward the light controlling member 74 and reflects S-polarized light of the incident light back toward the planarizing layer 150.

In detail, the reflected S-polarized light is guided toward the rear surface of the display apparatus to pass through the planarizing layer 150, the lower base substrate 176, the diffusion plate 30, and the light guide plate 20, in sequence, to be incident on and reflected from the rear reflecting plate 22. The reflected light that is reflected from the rear reflecting plate 22 is guided back toward the wire grid pattern 160 to pass through the light guide plate 20, the diffusion plate 30, the lower base substrate 176, and the planarizing layer 150, in sequence. A phase of a portion of the S-polarized light is changed into P-polarized light during the above-mentioned processes. The phase changed P-polarized light passes through the wire grid pattern 160 toward the light controlling member 74 to increase the luminance of the display apparatus.

Figure 3:
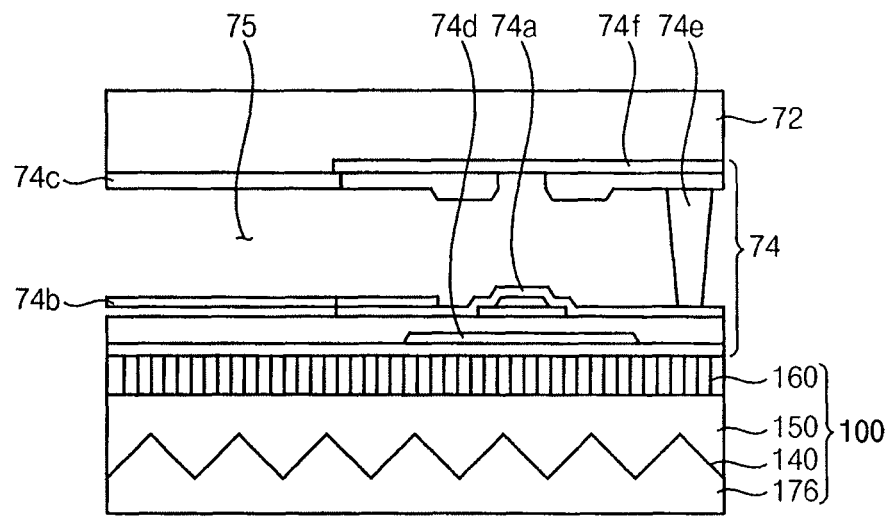
FIG. 3 illustrates an enlarged cross-sectional view of a portion of the display apparatus of FIG. 2.

FIG. 3 illustrates an enlarged cross-sectional view of a portion of the display apparatus of FIG. 2.

Referring to FIGS. 2 and 3, the light controlling member 74 is disposed on the complex substrate 100, and includes a thin film transistor 74a, a pixel electrode 74b, a common electrode 74c, a storage electrode 74d, a spacer 74e, and a black matrix 74f.

In the present exemplary embodiment, the light controlling member 74 is directly formed on the complex substrate 100. For example, an insulating layer, a conductive layer, etc., of the light controlling member 74, may be directly deposited on the wire grid pattern 160 of the complex substrate 100.

The storage electrode 74d is disposed on the wire grid pattern 160, e.g., an insulating layer may be interposed between the storage electrode 74d and the wire grid pattern 160. The storage electrode 74d overlaps the pixel electrode 74b, a conductive line (not shown), etc., to form a storage capacitor. The storage capacitor maintains a data voltage during one frame.

The thin film transistor 74a receives a gate voltage and the data voltage to apply the data voltage to the pixel electrode 74b. The pixel electrode 74b is disposed in a pixel region (PA of FIG. 4), and is electrically connected to the thin film transistor 74a.

The common electrode 74c is spaced apart from the pixel electrode 74b to receive the common voltage. When the data voltage is applied to the pixel electrode 74b, a voltage difference is formed between the pixel electrode 74b and the common electrode 74c.

A liquid crystal layer 75 is interposed between the pixel electrode 74b and the common electrode 74c. When the voltage difference is applied between the pixel electrode 74b and the common electrode 74c, liquid crystal molecules of the liquid crystal layer 75 change arrangements. When the arrangement of the liquid crystal molecules of the liquid crystal layer 75 is changed, optical characteristics of the liquid crystal layer 75 are changed, thereby changing light transmittance.

The spacer 74e is disposed in the liquid crystal layer 75 to control a cell gap of the liquid crystal layer 75. The cell gap corresponds to a thickness of the liquid crystal layer 75. In the present exemplary embodiment, the spacer 74e has a cylindrical shape, and is interposed between the upper substrate 72 and the thin film transistor 74a.

Figure 4:
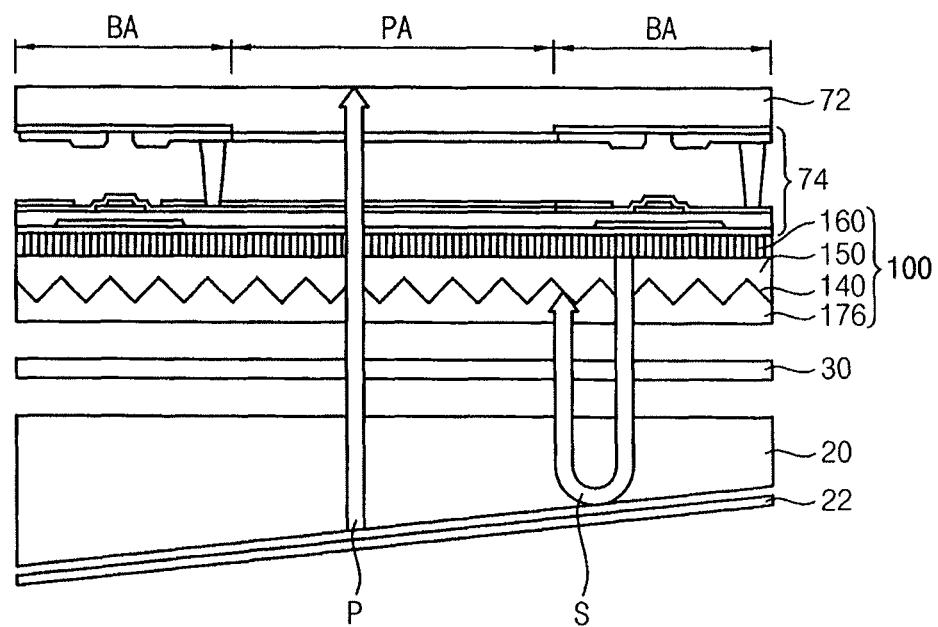
FIG. 4 illustrates a cross-sectional view of optical characteristics of the display apparatus of FIG. 2.

The black matrix 74f is disposed in a light blocking region (BA of FIG. 4). The image is not displayed in the light blocking region. The light blocking region corresponds to, e.g., overlaps, the thin film transistor 74a, the spacer 74e, etc. The pixel electrode 74b is not disposed in the light blocking region, so that the liquid crystal molecules in the light blocking region are uncontrollable. The black matrix 74f blocks the light incident into the light blocking region to increase contrast ratio of the image displayed on the display apparatus.

FIG. 4 illustrates a cross-sectional view illustrating optical characteristics of the display apparatus of FIG. 2.

Referring to FIGS. 2 to 4, light generated and emitted from the light source 10 is incident on the light guide plate 20. The light incident on the light guide plate 20 is reflected from a rear surface of the light guide plate 20 or the rear reflecting plate 22 to be guided toward the diffusion plate 30 (light P and S in FIG. 4).

The light P, S exiting from a front surface of the light guide plate 20 is incident on the diffusion plate 30. The light P, S incident on the diffusion plate 30 is diffused in the diffusion plate 30 so that luminance uniformity of the light P, S is improved.

The light P, S exiting from the diffusion plate 30 is incident on the lower base substrate 176 of the complex substrate 100. The light P, S incident on the lower base substrate 176 is refracted toward the front of the display apparatus by the prism pattern 140. In the present exemplary embodiment, the planarizing layer 150 has different refractivity from the lower base substrate 176, so that the light P, S incident on the lower base substrate 176 is guided toward the front by the prism pattern 150.

The P polarized light of the light P, S incident on the planarizing layer 150 passes through the wire grid pattern 160 to be incident on the light controlling member 74. The S polarized light of the light P, S incident on the planarizing layer 150 is reflected from the wire grid pattern 160 to be guided back toward the light guide plate 20. The S polarized light reflected from the wire grid pattern 160 passes through the polarizing layer 150, the lower base substrate 176, the diffusion plate 30, and the light guide plate 20, in sequence, to be reflected from the rear reflecting plate 22. The reflected S polarized light that is reflected from the rear reflecting plate 22 passes through the light guide plate 20, the diffusion plate 30, the lower base substrate 176, and the planarizing layer 150, in sequence, to be incident back on the wire grid pattern 160.

In the present exemplary embodiment, the S polarized light passes through the planarizing layer 150, the lower base substrate 176, the diffusion plate 30, and the light guide plate 20 two times, so that the polarization characteristics of the S polarized light is changed, thereby generating a mixed light including S polarized light and P polarized light. The P polarized light of the mixed light passes through the wire grid pattern 160 to be incident into the light controlling member 74, while the S polarized light of the mixed light is reflected from the wire grid pattern 160 to be guided back toward the light guide plate 20. Thus, the S polarized light is not absorbed by the wire grid pattern 160 but is repeatedly reflected between the wire grid pattern 160 and the rear reflecting plate 22, so a portion of the repeatedly reflected S polarized light is repeatedly converted into P polarized light to be transmitted through the wire grid pattern 160 to the light controlling member 74, thereby increasing light efficiency.

The light controlling member 74 controls the light transmittance of the light P using the optical characteristics of the liquid crystal layer 75. The light P having passed through the light controlling member 74 passes through the upper substrate 72 to display an image.

FIGS. 5 to 16 illustrate cross-sectional views of stages in a method of manufacturing the display apparatus of FIG. 2.

Figure 5:
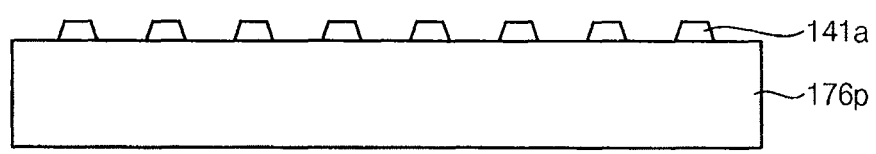
FIGS. 5 to 16 illustrate cross-sectional views of stages in a method of manufacturing the display apparatus of FIG. 2.

FIG. 5 illustrates a cross-sectional view of a photoresist pattern on a base substrate.

Referring to FIG. 5, a photoresist (not shown) is coated on a base substrate 176p. The photoresist (not shown) coated on the base substrate 176p is exposed and developed to form a photoresist pattern 141*a*. In the present exemplary embodiment, the photoresist pattern 141*a* has a strip shape with a constant interval.

Figure 6:
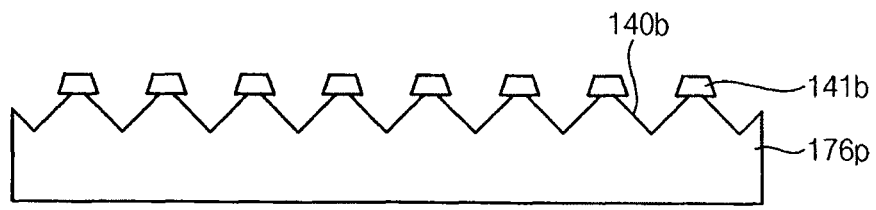

FIG. 6 illustrates a cross-sectional view of etching the base substrate 176*p* of FIG. 5 to form an etching pattern.

Referring to FIG. 6, the base substrate 176*p* is etched using the photoresist pattern 141*a* (in FIG. 5) as an etching mask to form an etching pattern 140*b*. In the present exemplary embodiment, the etching pattern 140*b* may be formed by various methods, e.g., dry etching, wet etching, etc. Undercuts are formed under both sides of the photoresist pattern 141*b*.

In the present exemplary embodiment, the size of the photoresist pattern 141*b* is decreased during the etching process, so that the photoresist pattern 141*b* after the etching process is smaller than the initial photoresist pattern 141*a* (shown in FIG. 5). The size of the undercuts is increased during the etching process.

Figure 7:
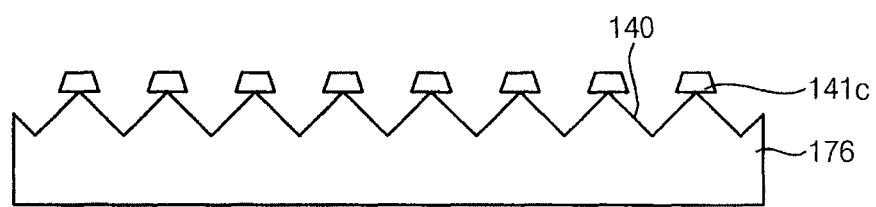

FIG. 7 illustrates a cross-sectional view illustrating etching the etching pattern of FIG. 6 to form the prism pattern 140.

Referring to FIGS. 7, the base substrate 176*p* (shown in FIG. 6) is etched using the photoresist pattern 141*b* (shown in FIG. 6) as an etching mask to form the prism pattern 140. In the present exemplary embodiment, the prism pattern 140 may be formed by various methods, e.g., dry etching, wet etching, etc. Adjacent undercuts of FIG. 6 grow to form the prism pattern 140.

In the present exemplary embodiment, the size of the photoresist pattern 141*b* is decreased during the etching process to form a reduced photoresist pattern 141*c*. That is, the photoresist pattern 141*c* is smaller than the photoresist pattern 141*b* of FIG. 6.

Figure 8:

FIG. 8 illustrates a cross-sectional view illustrating removing the photoresist pattern 141*c* from the lower base substrate 176*p* of FIG. 7.

Referring to FIGS. 8, the photoresist pattern 140*c* (shown in FIG. 7) disposed on the prism pattern 140 is removed to form the lower base substrate 176. For example, the photoresist pattern 140*c* (shown in FIG. 7) may be removed by stripping process.

Figure 9:
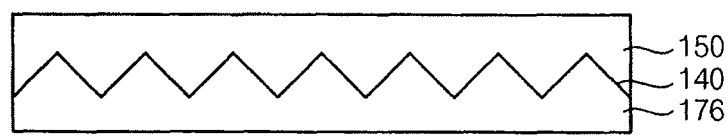

FIG. 9 illustrates a cross-sectional view illustrating forming the planarizing layer 150 on the lower base substrate of FIG. 8.

Referring to FIG. 9, high heat resistant and transparent material is coated on the lower base substrate 176 to form the planarizing layer 150. The planarizing layer 150 fills the prism pattern 140. A lower surface of the planarizing layer 150 makes, e.g., direct, contact with the prism pattern 140, and an upper surface of the planarizing layer 150 has a planar shape. In the present exemplary embodiment, the high heat resistant and transparent material may include, e.g., polyimide, siloxane, etc.

Figure 10:
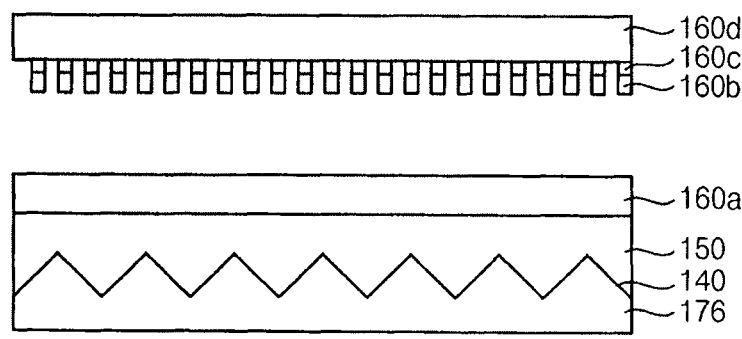

FIG. 10 illustrates a cross-sectional view illustrating forming a wire metal layer on the planarizing layer of FIG. 9.

Referring to FIG. 10, metal is deposited on the planarizing layer 150 to form a wire metal layer 160*a*. For example, the wire metal layer 160*a* may include aluminum, silver, chromium, etc., or an alloy thereof. Photoresist is coated on a printing substrate 160*d*, on which a printing pattern 160*c* is formed. In the present exemplary embodiment, the photoresist is coated under the printing pattern 160*c* to form a wire grid photoresist 160*b*.

Figure 11:
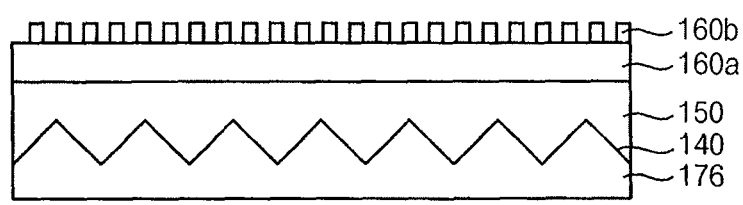

FIG. 11 illustrates a cross-sectional view illustrating printing the wire grid photoresist on the wire metal layer of FIG. 10.

Referring to FIG. 11, the wire grid photoresist 160*b* is printed on the wire metal layer 160*a*. In the present exemplary, the printing pattern 160*c*, on which the wire grid photoresist 160*b* is printed, makes contact with the wire metal layer 160*a* so that the wire grid photoresist 160*b* is printed on the wire metal layer 160*b*.

Figure 12:
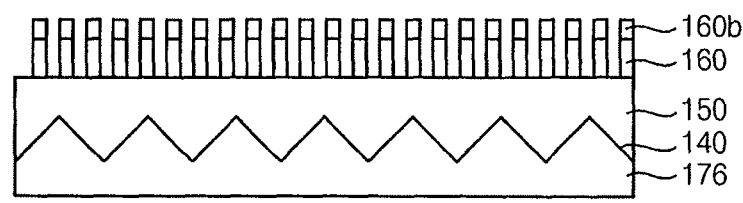

FIG. 12 illustrates a cross-sectional view illustrating patterning the wire metal layer of FIG. 11 to form the wire grid pattern 160.

Referring to FIG. 12, the wire metal layer 160*a* (shown in FIG. 11) is etched using the wire grid photoresist 160*b* as an etching mask to form the wire grid pattern 160.

Figure 13:
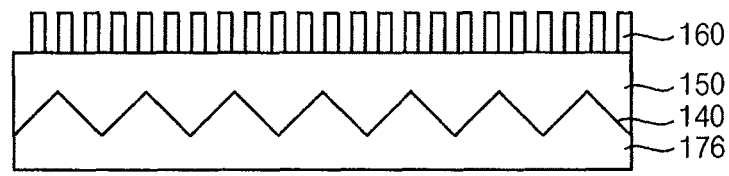

FIG. 13 illustrates a cross-sectional view illustrating removing the wire grid photoresist from the wire grid pattern of FIG. 12.

Referring to FIG. 13, the wire grid photoresist 160*b* is removed from the wire grid pattern 160. For example, the wire grid photoresist 160*b* may be stripped from the wire grip pattern 160. Thus, the complex substrate 100 is completed.

Figure 14:
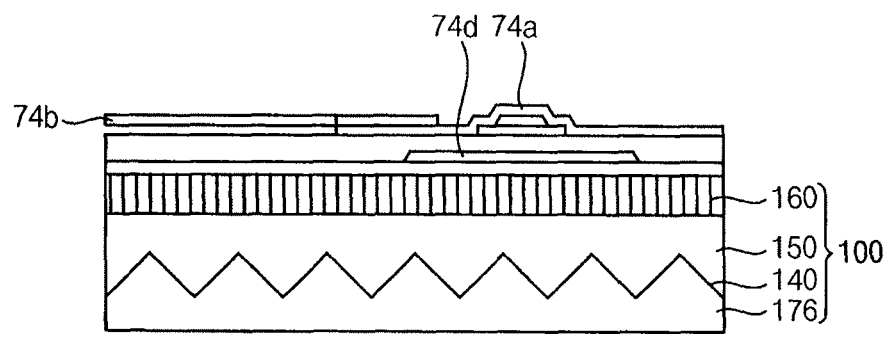

FIG. 14 illustrates a cross-sectional view illustrating forming the storage electrode, the thin film transistor, and the pixel electrode on the complex substrate of FIG. 13.

Referring to FIG. 14, an insulating layer and the storage electrode 74*d* are formed on the complex substrate 100. For example, silicon oxide, silicon nitride, etc., may be deposited on the complex substrate 100 to form the insulating layer. A metal layer is deposited on the insulating layer. The metal layer may be patterned through a photolithography process to form the storage electrode 74*d*.

An insulating interlayer and the thin film transistor 74*a* are formed on the insulating layer on which the storage electrode 74*d* is formed. The insulating interlayer and the thin film transistor 74*a* may be formed by various thin film processes.

The pixel electrode 74*b* is formed on the insulating interlayer on which the thin film transistor 74*a* is formed. The pixel electrode 74*b* is electrically connected to a drain electrode of the thin film transistor 74*a*.

Figure 15:
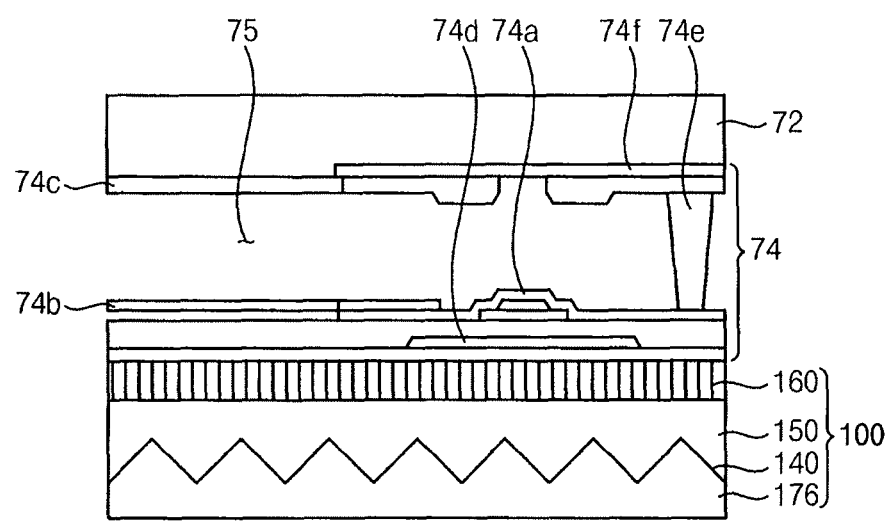

FIG. 15 illustrates a cross-sectional view illustrating forming the liquid crystal layer, the spacer, the common electrode, the black matrix, and the upper substrate on the structure of FIG. 14.

Referring to FIG. 15, the black matrix 74*f* is formed on the upper substrate 72. For example, an opaque material such as chromium oxide, etc., may be deposited on the upper substrate 72. The deposited opaque material may be patterned through a photolithography process to form the black matrix 74*f*.

The common electrode 74*c* is formed on the upper substrate 72 on which the black matrix 74*f* is formed. Alternatively, a color filter (not shown) may be formed on the upper substrate 72.

The spacer 74*e* is formed on the upper substrate 72 on which the common electrode 74*c* is formed. The upper substrate 72 is combined with the complex substrate 100 on which the pixel electrode 74*b* is formed.

The liquid crystal layer 75 is formed between the common electrode 74*c* and the pixel electrode 74*b*. Thus, the display panel including the light controlling member 74 is completed.

Figure 16:
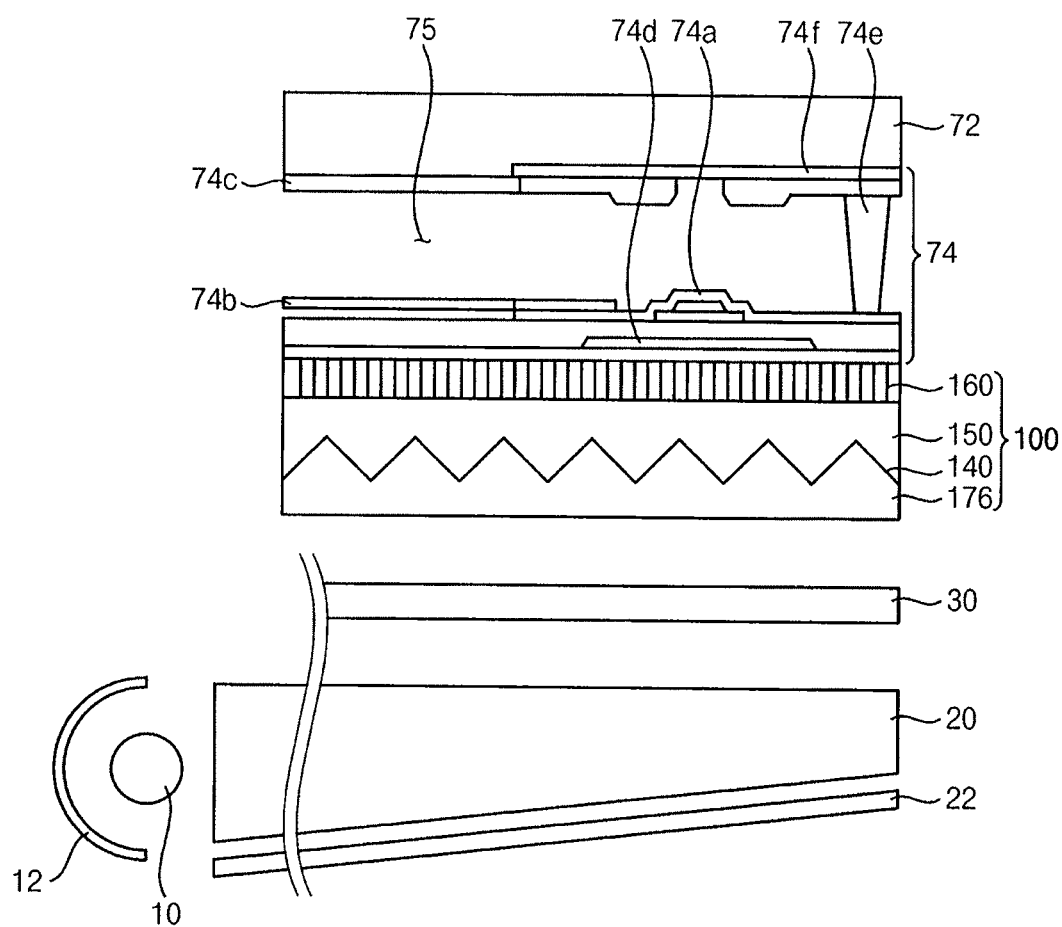

FIG. 16 illustrates a cross-sectional view illustrating forming the diffusion plate, the light guide plate, the rear reflecting plate, the light source, and the side reflecting plate under the display panel of FIG. 15.

Referring to FIG. 16, the diffusion plate 30 is disposed under the display panel including the light controlling member 74. The light guide plate 20 and the rear reflecting plate 22 are disposed under the diffusion plate 30. The light source 10 and the side reflecting plate 12 are disposed on the side of the light guide plate 20.

According to the present exemplary embodiment, the complex substrate 100 includes the prism pattern 140 so an additional prism sheet may be omitted. Also, the complex substrate 100 includes the wire grid pattern 160 so that an additional polarizing plate may be omitted. Thus, an overall thickness of the display apparatus may be decreased.

In addition, if a wire grid pattern is disposed outside of the prism pattern, e.g., with an empty spaced therebetween, the light may pass through the wire grid pattern and the prism pattern, in sequence, thereby decreasing luminance. However, in the present exemplary embodiment, the wire grid pattern 160 is disposed on the prism pattern 140, e.g., without an empty space therebetween, so that the P-polarized light passes through the wire grid pattern 160 after having passed through the prism pattern 140. Thus, the luminance of the display apparatus may not be decreased. Also, S-polarized light is not absorbed by the wire grid pattern 160, but is repeatedly reflected, thereby increasing the light efficiency.

Figure 17:
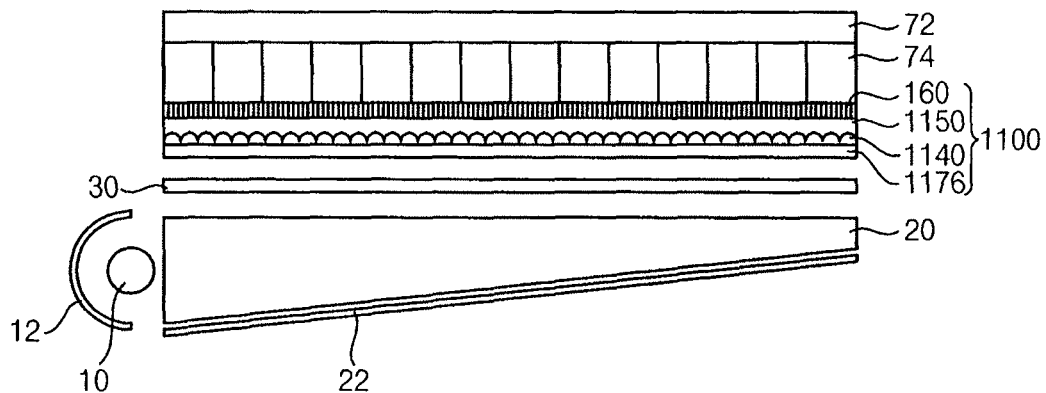
FIG. 17 illustrates a cross-sectional view of a display apparatus according to an exemplary embodiment.

FIG. 17 illustrates a cross-sectional view illustrating a display apparatus according to an exemplary embodiment. The display apparatus of FIG. 17 is substantially the same as shown in FIGS. 2 to 16, except for the complex substrate. Thus, any repetitive explanations concerning the same elements will be omitted.

Referring to FIG. 17, the display apparatus includes the light source 10, the side reflecting plate 12, the light guide plate 20, the rear reflecting plate 22, the diffusion plate 30, a complex substrate 1100, the light controlling member 74, and the upper substrate 72.

The complex substrate 1100 is disposed on the diffusion plate 30. The complex substrate 1100 improves optical characteristics of the light having passed through the diffusion plate 30 and supports the light controlling member 74. The complex substrate 1100 may include a lower base substrate 1176, a micro lens array 1140, a planarizing layer 1150, and a wire grid pattern 160.

The lower base substrate 1176 includes a transparent material, e.g., tempered glass, synthetic resin, etc. The lower base substrate 1176 has a substantially flat shape.

The micro lens array 1140 is formed on the lower base substrate 1176. The micro lens array 1140 has repeating hemi-spherical shapes. In the present exemplary embodiment, the micro lens array 1140 has different material from the lower base substrate 1176, and is integrally formed with the lower base substrate 1176. In the present exemplary embodiment, the micro lens array 1140 includes transparent material such as synthetic resin. For example, a height of the micro lens array 1140 may be about 10 μm to about 200 μm.

The light incident from a lower surface of the complex substrate 1100 is refracted toward a front of the display apparatus while the light exits the micro lens array 1140. Thus, the front luminance of the display apparatus is improved.

The planarizing layer 1150 is disposed on the micro lens array 1140 and is integrally formed with the micro lens array 1140. The planarizing layer 1150 includes transparent and heat resistant material, e.g., metal oxide, high heat resistant plastic, ceramic, etc. Examples of the metal oxide that may be used for the planarizing layer 1150 may include, e.g., silicon oxide, silicon nitride, etc. In another example, the planarizing layer 1150 may include, e.g., polyimide, siloxane, etc. For example, the planarizing layer 1150 may have different refractivity from the lower base substrate 1176.

The wire grid pattern 160 is disposed on the planarizing layer 1150 to polarize the light having passed through the planarizing layer 1150. In the present exemplary embodiment, the wire grid pattern 160 includes a reflective typed polarizing plate. For example, the wire grid pattern 160 transmits P-polarized light and reflects S-polarized light of the incident light. The reflected S-polarized light is guided toward the rear surface of the display apparatus to pass through the planarizing layer 1150, the micro lens array 1140, the lower base substrate 1176, the diffusion plate 30 and the light guide plate 20, in sequence, to be reflected from the rear reflecting plate 22. The reflected light that is reflected from the rear reflecting plate 22 is guided toward the wire grid pattern 160 to pass through the light guide plate 20, the diffusion plate 30, the lower base substrate 1176, the micro lens array 1140, and the planarizing layer 150, in sequence. A phase of a portion of the S-polarized light is changed into the P-polarized light during the above-mentioned processes. The phase changed P-polarized light passes through the wire grid pattern 160 to increase the luminance of the display apparatus.

Figure 18:
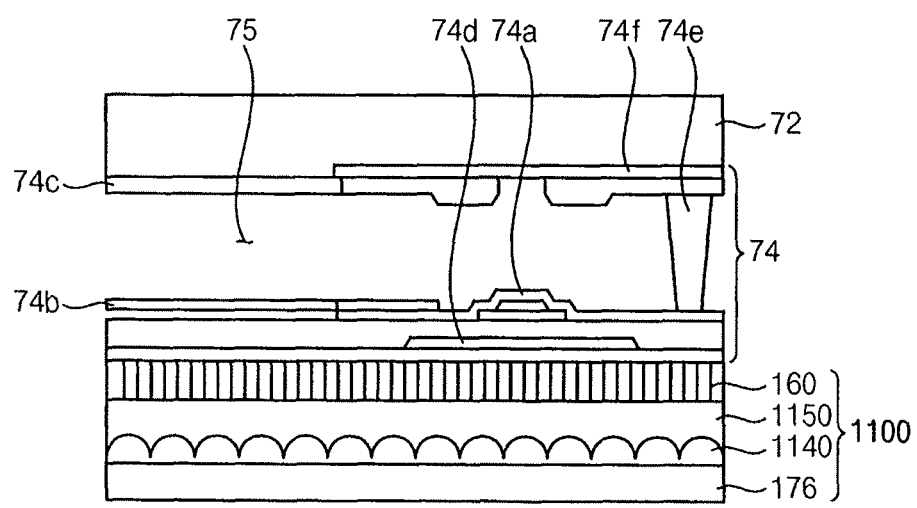
FIG. 18 illustrates a cross-sectional view of a portion of the display apparatus of FIG. 17.

FIG. 18 illustrates a cross-sectional view illustrating a portion of the display apparatus of FIG. 17.

Referring to FIGS. 17 and 18, the light controlling member 74 is disposed on the complex substrate 1100, and includes the thin film transistor 74a, the pixel electrode 74b, the common electrode 74c, the storage electrode 74d, the spacer 74e, and the black matrix 74f. In the present exemplary embodiment, the light controlling member 74 is directly formed on the complex substrate 1100. For example, an insulating layer, a conductive layer, etc., may be directly deposited on the wire grid pattern 160 of the complex substrate 1100.

Figure 19:
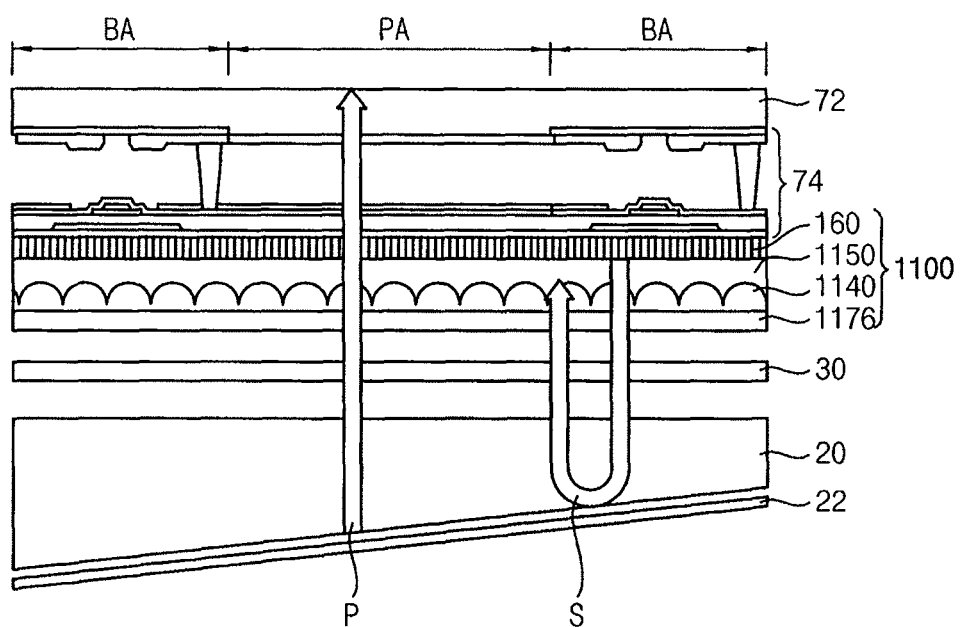
FIG. 19 illustrates a cross-sectional view of optical characteristics of the display apparatus of FIG. 17.

FIG. 19 illustrates a cross-sectional view illustrating optical characteristics of the display apparatus of FIG. 17.

Referring to FIGS. 17 to 19, the light generated from the light source 10 is incident on the light guide plate 20. The light P, S incident on the light guide plate 20 is reflected from the rear surface of the light guide plate 20 or the rear reflecting plate 22 to be guided toward the diffusion plate 30.

The light P, S exiting from a front surface of the light guide plate 20 is incident on the diffusion plate 30. The light P, S incident on the diffusion plate 30 is diffused in the diffusion plate 30 so that the luminance uniformity of the light P, S is improved.

The light P, S exiting from the diffusion plate 30 is incident on the lower base substrate 176 of the complex substrate 1100. The light P, S incident on the lower base substrate 1176 is refracted toward the front of the display apparatus by the prism pattern 1140.

In the present exemplary embodiment, the micro lens array 1140 has different refractivity from the lower base substrate 176, so that the light P, S incident on the lower base substrate 1176 is guided toward the front by the micro lens array 1140 at the interface between the lower base substrate 1176 and the micro lens array 1140. The lights P, S that is incident on the micro lens array 1140 is refracted toward the front of the micro lens array 1140. In the present exemplary embodiment, the micro lens array 1140 has different refractivity from the planarizing layer 1150, so that the light P, S incident on the micro lens array 1140 is guided toward the front by the micro lens array 1140 at the interface between the planarizing layer 1150 and the micro lens array 1140.

In the present exemplary embodiment, the micro lens array 1140 has the hemispherical shape, so that the light P, S incident on the micro lens array 1140 is refracted in the front direction and is diffused. The P-polarized light of the light P, S incident on the planarizing layer 1150 passes through the wire grid pattern 160 to be incident on the light controlling member 74.

The S-polarized light of the light P, S incident on the planarizing layer 1150 is reflected from the wire grid pattern 160 to be guided toward the light guide plate 20. The S-polarized light reflected from the wire grid pattern 160 passes through the polarizing layer 1150, the lower base substrate 1176, the micro lens array 1140, the diffusion plate 30, and the light guide plate 20, in sequence, to be reflected from the rear reflecting plate 22. The reflected S-polarized light that is reflected from the rear reflecting plate 22 passes through the light guide plate 20, the diffusion plate 30, the lower base substrate 1176, the micro lens array 1140, and the planarizing layer 1150, in sequence, to be incident on the wire grid pattern 160.

In the present exemplary embodiment, the S-polarized light passes through the planarizing layer 1150, the micro lens array 1140, the lower base substrate 1176, the diffusion plate 30, and the light guide plate 20 two times, so that the polarization characteristics of the S-polarized light is changed, thereby generating a mixed light including S polarized light and P polarized light. Therefore, the P-polarized light of the mixed light passes through the wire grid pattern 160 to be incident on the light controlling member 74, while the S-polarized light of the mixed light is reflected from the wire grid pattern 160 to be guided into the light guide plate 20. Thus, the S-polarized light is not absorbed by the wire grid pattern 160 but repeatedly reflected, thereby increasing light efficiency.

The light controlling member 74 controls the light transmittance of the light P using the optical characteristics of the liquid crystal layer 75. The light P having passed through the light controlling member 74 passes through the upper substrate 72 to display an image.

FIGS. 20 to 28 illustrate cross-sectional views illustrating stages in a method of manufacturing the display apparatus of FIG. 17.

Figure 20:
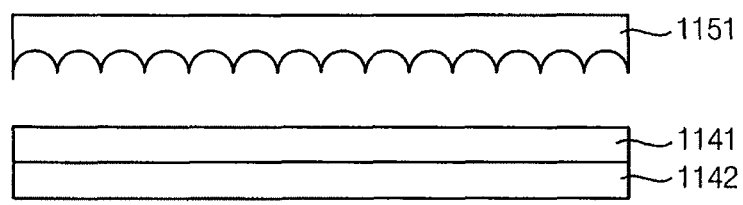
FIGS. 20 to 28 illustrate cross-sectional views of stages in a method of manufacturing the display apparatus of FIG. 17.

FIG. 20 illustrates a cross-sectional view of forming a photoresist layer on a printing substrate.

Referring to FIG. 20, a photoresist (not shown) is coated on a printing substrate 1142 to form the photoresist layer 1141.

A printing case 1151 is aligned over the photoresist layer 1141 coated on the printing substrate 1142. In the present exemplary embodiment, the printing cast 1151 has an array having repeating hemispherical concave shapes.

Figure 21:
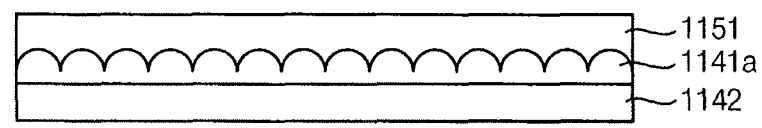

FIG. 21 illustrates a cross-sectional view illustrating forming a photoresist layer using the printing case of FIG. 20. Referring to FIG. 21, the printing case 1151 is pressed on the photoresist layer 1141 (shown in FIG. 20) so that photoresist material 1141b of the photoresist layer 1141 (shown in FIG. 20) is filled in the printing cast 1151.

Figure 22:
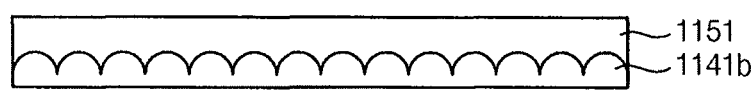

FIG. 22 illustrates a cross-sectional view of detaching the photoresist material of FIG. 21 from the printing substrate. Referring to FIG. 22, the printing cast 1151 is detached from the printing substrate 1142. The photoresist material 1141b disposed in the printing cast 1151 is separated with the printing cast 1151 from the printing substrate 1142.

Figure 23:
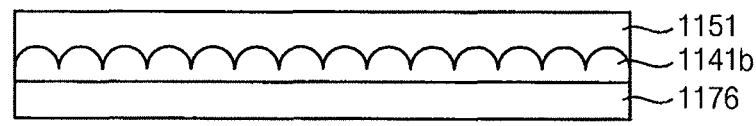

FIG. 23 illustrates a cross-sectional view of attaching the photoresist material disposed in the printing cast of FIG. 22 to the lower base substrate. Referring to FIG. 23, the printing cast 1151 including the photoresist material 1141b is attached to the lower base substrate 1176.

Figure 24:
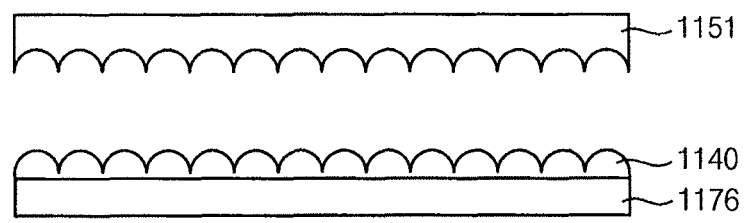

FIG. 24 illustrates a cross-sectional view of forming the micro lens array from the photoresist of FIG. 23.

Referring to FIGS. 24, the photoresist 1141b (shown in FIG. 23) attached to the lower base substrate 1176 is exposed by ultraviolet light to be solidified. The photoresist 1141b (shown in FIG. 23) is solidified to form the micro lens array 1140. The printing cast 1151 is detached from the micro lens array 1140.

Figure 25:
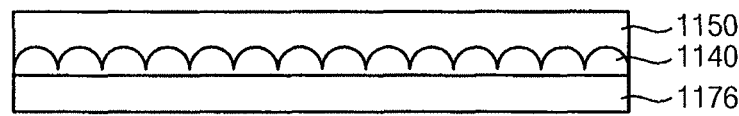

FIG. 25 illustrates a cross-sectional view of the planarizing layer on the micro lens array of FIG. 24.

Referring to FIG. 25, the heat resistive and transparent material is coated on the micro lens array 1140 to form the planarizing layer 1150. The planarizing layer 1150 fills the micro lens array 1140. The planarizing layer 1150 makes contact with the micro lens array 1140. An upper surface of the planarizing layer 1150 has a substantially flat shape. In the present exemplary embodiment, the heat resistive and transparent material may include, e.g., polyimide, siloxane, etc.

Figure 26:
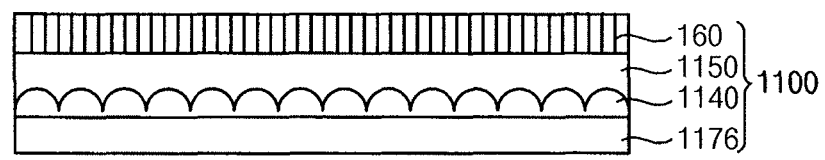

FIG. 26 illustrates a cross-sectional view of forming the wire grid pattern on the planarizing layer of FIG. 25. Referring to FIG. 26, the wire grid pattern 160 is formed on the planarizing layer 1150. Thus, the complex substrate 1100 is completed.

Figure 27:
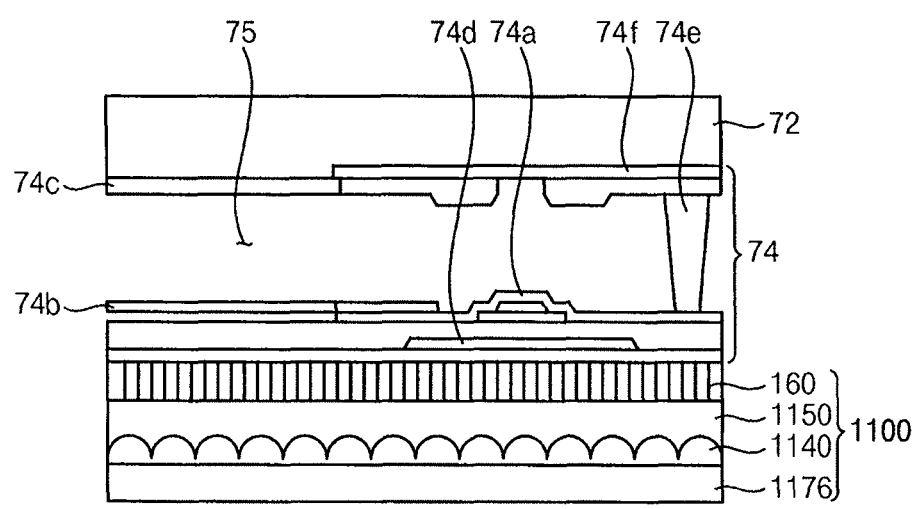

FIG. 27 illustrates a cross-sectional view of forming the storage electrode, the thin film transistor, and the pixel electrode on the complex substrate of FIG. 26. Referring to FIG. 27, the storage electrode 74d, the thin film transistor 74a, and the pixel electrode 74b are formed on the complex substrate 1100. The black matrix 74f, the common electrode 74c, and the spacer 74e are formed on the upper substrate 72.

The upper substrate 72 is combined with the complex substrate 1100 on which the pixel electrode 74b is formed. The liquid crystal 75 is formed between the common electrode 74c and the pixel electrode 74b. Thus, the display panel including the light controlling member 74 is completed.

Figure 28:
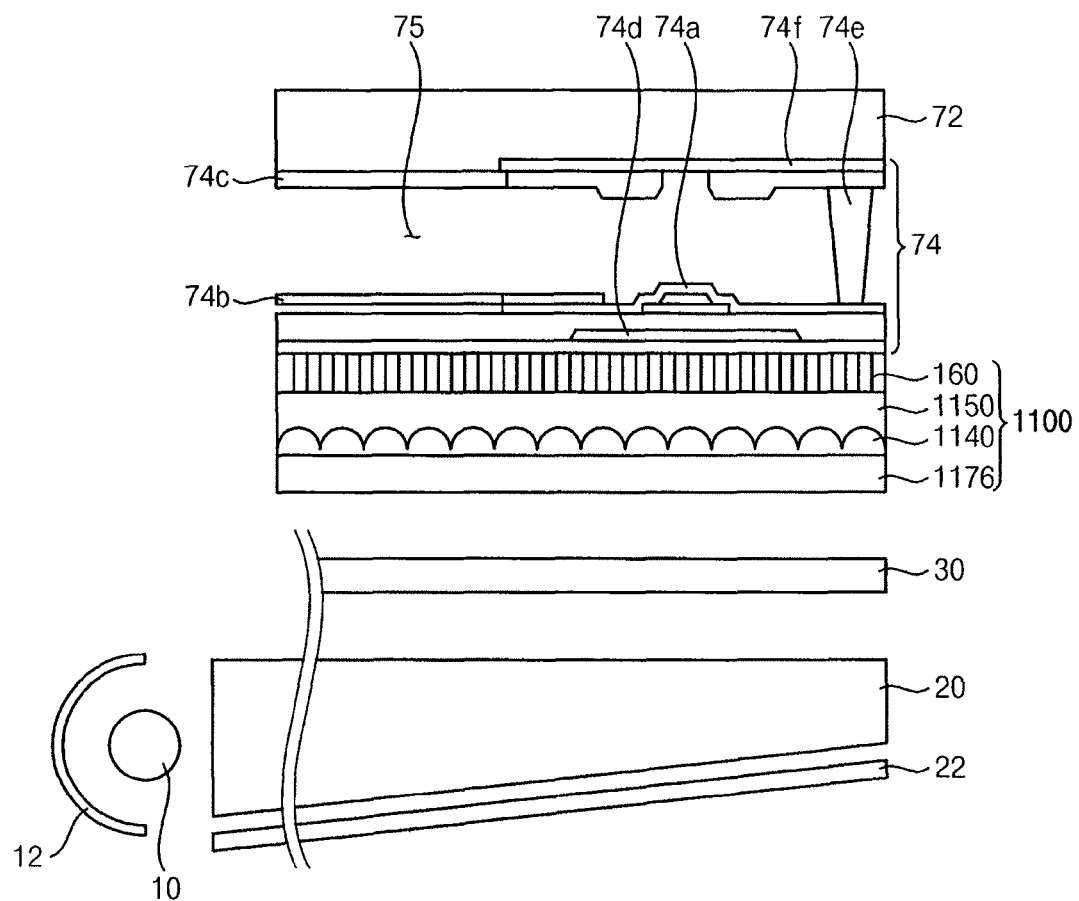

FIG. 28 illustrates a cross-sectional view of forming the diffusion plate, the light guide plate, the rear reflecting plate, the light source, and the side reflecting plate under the display panel of FIG. 27. Referring to FIG. 28, the diffusion plate 30 is disposed under the display panel including the light controlling member 74.

The light guide plate 20 and the rear reflecting plate 22 are disposed under the diffusion plate 30. The light source 10 and the side reflecting plate 12 are disposed on the side of the light guide plate 20.

According to the present exemplary embodiment, the complex substrate 1100 includes the micro lens array 1140 so that an additional prism sheet may be omitted. Also, the micro lens array 1140 has a semi hemispherical shape so that front luminance and luminance uniformity may be improved.

By way of summary and review, according to embodiments, a complex substrate includes a prism pattern so that additional prism sheet may be omitted. Also, the complex substrate includes a wire grid pattern so that an additional polarizing plate may be omitted. Thus, the thickness of the display apparatus may be decreased.

In particular, if the wire grid pattern is disposed on an outer surface of the prism pattern, e.g., with an empty spaced therebetween, the light may pass through the wire grid pattern and the prism pattern, in sequence, so that luminance of the display apparatus may be decreased. However, when the wire grid pattern of the present invention is disposed on an inner surface of the prism pattern or the micro lens array, e.g., without an empty space therebetween, the light passes through the wire grid pattern after that light having passed through the prism pattern. Thus, the luminance of the display apparatus may not be decreased.

In addition, S-polarized light is not absorbed by the wire grid pattern but is reflected from the wire grid pattern. Thus, the reflected light is recycled to increase the luminance of the display apparatus.

Furthermore, the complex substrate includes the micro lens array so that additional prism sheet may be omitted. Also, the micro lens array has substantially semi-spherical shape so that front luminance and luminance uniformity are simultaneously improved.

In the above-mentioned exemplary embodiments, the convex and concave shapes of the prisms included hemispherical shapes of prisms that were used to improve optical characteristics. However, embodiments are not limited thereto, e.g., the convex and concave shapes of the prisms may include a non-spherical shape, a trapezoidal shape, a pyramid shape, etc., on the complex substrate.

In the above-mentioned exemplary embodiments, the display apparatus includes a side illumination type backlight assembly. However, embodiments are not limited thereto, e.g., the display apparatus may include a rear illumination type backlight assembly.

By way of summary and review, a conventional display panel may include a plurality of optical members, e.g., a planarizing plate, a diffusion plate, a prism sheet, a light guide plate, a protective film, etc. However, the optical members in the conventional display panel do not have sufficient heat resistance, and may be easily deteriorated by ultraviolet light. Also, these optical members may absorb about a half of the light generated by the backlight assembly, thereby decreasing light efficiency of the display apparatus. In addition, when the number of the optical members is increased, an overall thickness of the display apparatus increases and the manufacturing process becomes complex.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A complex substrate for a display apparatus, the complex substrate comprising:
 a lower base substrate including convex and concave patterns, the convex and concave patterns defining a light condensing layer on the lower base substrate, and the light condensing layer being integral with an upper side of the lower base substrate;
 a planarizing layer on the lower base substrate, the planarizing layer being integral with the convex and concave patterns, and the planarizing layer having different refractivity from the lower base substrate; and
 a wire grid pattern directly on the planarizing layer, the planarizing layer being between the wire grid pattern and the light condensing layer, and the wire grid pattern including a plurality of nano wire metal patterns, each of the nano wire metal patterns having a width of no more than a micrometer,
 wherein the lower base substrate, the convex and concave patterns, and the planarizing layer are integrated into a single structure having flat upper and lower surfaces, and
 wherein the planarizing layer has a complementary shape with respect to the convex and concave patterns, the planarizing layer fitting within spaces between adjacent convex and concave patterns, and lateral outermost surfaces of the planarizing layer being coplanar with respective lateral outermost surfaces of the lower base substrate.

2. The complex substrate for the display apparatus as claimed in claim 1, wherein the convex and concave patterns include a plurality of repeating triangular prism patterns.

3. The complex substrate for the display apparatus as claimed in claim 1, wherein the planarizing layer includes a high heat resistant material.

4. The complex substrate for the display apparatus as claimed in claim 1, wherein:
 wherein the lower base substrate, the planarizing layer, and the wire grid pattern are integrally and sequentially stacked on top of each other, in the stated order, and
 a lower side of the lower base substrate faces a light source of the display apparatus, the lower side of the lower substrate being opposite the upper side of the lower base substrate with the light condensing layer.

5. The complex substrate for the display apparatus as claimed in claim 1, wherein the convex and concave patterns include a micro lens array having a plurality of repeating hemispherical shapes.

6. The complex substrate for the display apparatus as claimed in claim 5, wherein the micro lens array is on the lower base substrate, and includes a different material from the lower base substrate.

7. The complex substrate for the display apparatus as claimed in claim 6, wherein the micro lens array exhibits a different refractivity than the lower base substrate.

8. The complex substrate for the display apparatus as claimed in claim 7, wherein the lower base substrate, the micro lens array, the planarizing layer, and the wire grid pattern are integrally and sequentially stacked on top of each other, in the stated order.

9. The complex substrate for the display apparatus as claimed in claim 1, wherein an aspect ratio of the nano wire metal patterns is 3 or less.

10. The complex substrate for the display apparatus as claimed in claim 9, wherein the nano wire metal patterns include aluminum.

11. The complex substrate for the display apparatus as claimed in claim 10, wherein the wire grid pattern transmits P polarized light, and reflects S polarized light.

12. The complex substrate for the display apparatus as claimed in claim 1, further comprising a liquid crystal element on the wire grid pattern, the wire grid pattern being between the liquid crystal element and the planarizing layer.

13. A display apparatus, comprising:
 a light source generating light;
 a diffusion plate on the light source to increase luminance uniformity of the light generated from the light source;
 a complex substrate on the diffusion plate, the complex substrate including:
  a lower base substrate including convex and concave patterns, the convex and concave patterns defining a light condensing layer on the lower base substrate, and the light condensing layer being integral with an upper side of the lower base substrate,
a planarizing layer on the lower base substrate, the planarizing layer being integral with the convex and concave patterns, and the planarizing layer having different refractivity from the lower base substrate, and
a wire grid pattern directly on the planarizing layer, the planarizing layer being between the wire grid pattern and the light condensing layer, and the wire grid pattern including a plurality of nano wire metal patterns, each of the nano wire metal patterns having a width of no more than a micrometer;
a light controlling member on the wire grid pattern of the complex substrate to change light transmittance based on an image signal; and
an upper substrate on the light controlling member,
wherein the lower base substrate, the convex and concave patterns, and the planarizing layer are integrated into a single structure having flat upper and lower surfaces, and
wherein the planarizing layer has a complementary shape with respect to the convex and concave patterns, the planarizing layer fitting within spaces between adjacent convex and concave patterns, and lateral outermost surfaces of the planarizing layer being coplanar with respective lateral outermost surfaces of the lower base substrate.

14. A method of manufacturing a complex substrate for a display apparatus, the method comprising:
forming a lower base substrate including convex and concave patterns, the convex and concave patterns defining a light condensing layer on the lower base substrate, and the light condensing layer being integral with an upper side of the lower base substrate;
forming a planarizing layer on the lower base substrate, the planarizing layer being integral with the convex and concave patterns, and the planarizing layer having different refractivity from the lower base substrate; and
forming a wire grid pattern directly on the planarizing layer, the planarizing layer being between the wire grid pattern and the light condensing layer, and the wire grid pattern including a plurality of nano wire metal patterns, each of the nano wire metal patterns having a width of no more than a micrometer,
wherein the lower base substrate, the convex and concave patterns, and the planarizing layer are integrated into a single structure having flat upper and lower surfaces, and
wherein the planarizing layer has a complementary shape with respect to the convex and concave patterns, the planarizing layer fitting within spaces between adjacent convex and concave patterns, and lateral outermost surfaces of the planarizing layer being coplanar with respective lateral outermost surfaces of the lower base substrate.

15. The method as claimed in claim 14, wherein forming the planarizing layer includes coating a transparent material on the convex and concave patterns, the convex and concave patterns being a prism sheet or a hemispherical micro lens array.

16. The method as claimed in claim 15, wherein the convex and concave patterns are a prism sheet, forming the prism sheet including:
forming a photoresist pattern having a stripe shape on the lower base substrate, the stripe shape having linear patterns spaced apart from each other by a constant interval;
etching the lower base substrate using the photoresist pattern as an etching mask to form the prism sheet with a prism pattern on an upper surface of the lower base substrate, such that undercuts are formed under opposite sides of the photoresist pattern; and
removing the photoresist pattern from the prism sheet.

17. The method as claimed in claim 15, wherein the convex and concave patterns are a hemispherical lens array, and forming the hemispherical lens array includes:
filling photoresist material in a printing cast, the printing cast having repeating semi hemispherical concave shapes;
attaching the filled photoresist material to the lower base substrate;
solidifying the photoresist material that is attached on the lower base substrate; and
removing the printing cast from the solidified photoresist material.

18. The method as claimed in claim 14, wherein forming the wire grid pattern includes:
forming a wire metal layer on the planarizing layer;
printing a wire grid photoresist on the wire metal layer; and
etching the wire metal layer using the wire grid photoresist as an etching mask.

* * * * *